W. F. HOLT.
STEERING GEAR LOCK FOR AUTOVEHICLES.
APPLICATION FILED JULY 2, 1917.
1,262,796. Patented Apr. 16, 1918.
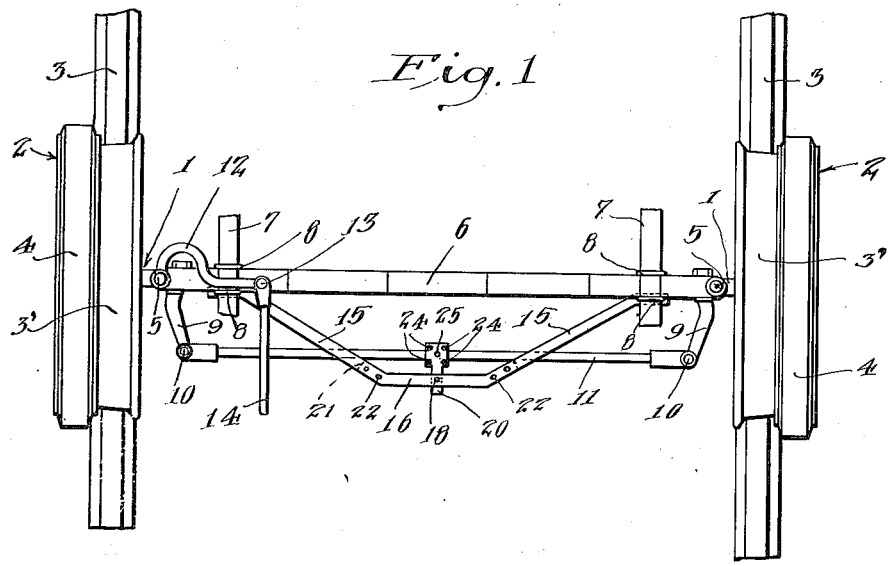
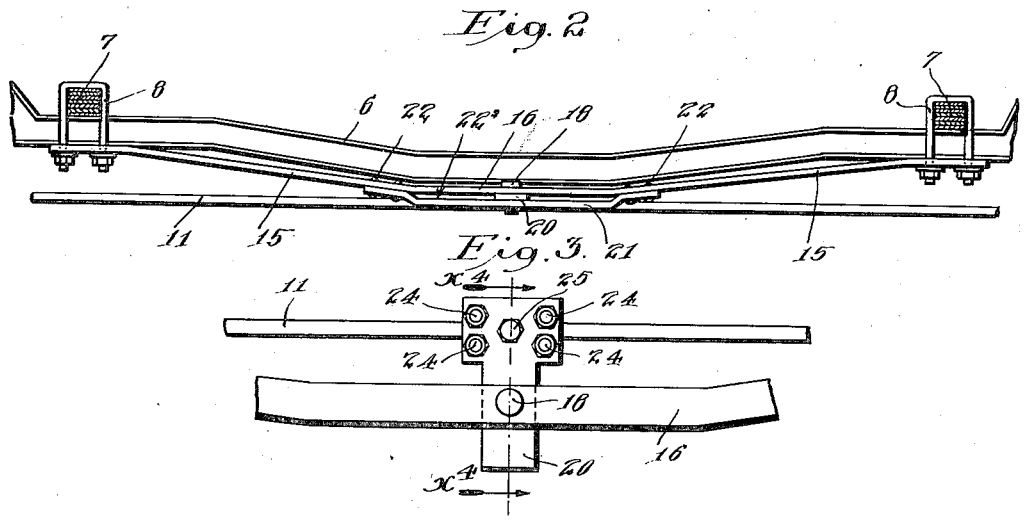
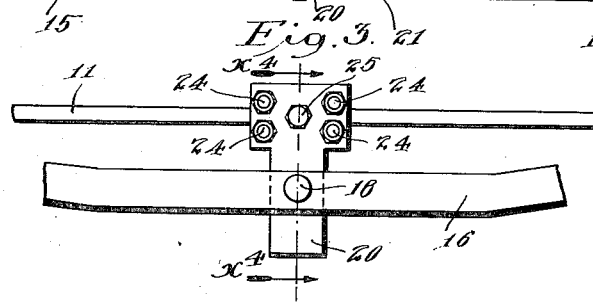
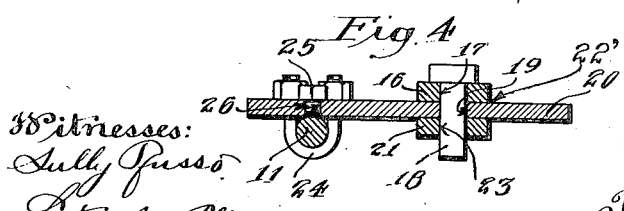
Witnesses:
Inventor
William F. Holt
By Frederick R. Kyou, atty

UNITED STATES PATENT OFFICE.

WILLIAM F. HOLT, OF LOS ANGELES, CALIFORNIA.

STEERING-GEAR LOCK FOR AUTOVEHICLES.

1,262,796.   Specification of Letters Patent.   Patented Apr. 16, 1918.

Application filed July 2, 1917. Serial No. 178,219.

*To all whom it may concern:*

Be it known that I, WILLIAM F. HOLT, a citizen of the United States, residing at Los Angeles, in the county of Los Angeles and State of California, have invented a new and useful Steering-Gear Lock for Autovehicles, of which the following is a specification.

This invention relates to devices of the character shown in my patent for steering bar lock, issued January 25, 1916, No. 1,169,402, and the device is intended to be used in lieu of the device shown in said patent in the transportation system patented to me January 16, 1917 No. 1,212,487.

This device is used to prevent deflection of the wheels of the automobile from straight ahead position when said wheels are traveling on a railroad track, and an object of the invention is to make a device of this character which is simple, strong and effective.

Other objects and advantages will appear in the subjoined detail description.

The accompanying drawings illustrate the invention:

Figure 1 is a plan view of the front axle and wheels of an auto vehicle showing the invention applied thereto, a fragment of the railroad track also being shown.

Fig. 2 is an enlarged fragmentary front elevation of Fig. 1.

Fig. 3 is an enlarged plan detail showing the connection between the steering bar and the axle.

Fig. 4 is an enlarged sectional elevation on line indicated by $x^4$—$x^4$, Fig. 3.

The stub axles are indicated at 1 in Fig. 1 and said stub axles are provided with wheels 2 constructed so as to ride along the rails 3 of a railroad track the same as an ordinary car wheel and therefore having a rail-tread 3', and capable of running on an ordinary roadway and for that reason provided with a road-tread preferably in the form of a resilient tire 4. The wheels 2 may be of any suitable construction and the wheels shown are analogous to those described and claimed in my co-pending application for patent for wheel for automobiles filed June 27, 1917, Serial No. 177,278.

The stub axles 1 are pivoted at 5 to the main axle 6 of the vehicle and thus the wheels are dirigibly connected with the axle, the springs 7 of the vehicle being connected by U-bolts 8 to the main axle 6 as clearly shown in Fig. 2.

The stub axles 1 are provided with arms 9 in the usual way pivoted at 10 to a steering rod 11 which extends transversely in front of the axle 6 and a trifle below the level of said axle. One of the stub axles 1 is provided with an arm 12 pivoted at 13 to a connecting rod 14 which in turn is connected to suitable steering mechanism of any desired or preferred construction, not shown. When the rod 14 is moved backward and forward it swings the arm 12 so as to swing the stub axles 1 on their pivots 5 thus causing steering of the wheels 2 in a manner well understood in the automobile art.

Extending rearward of the axle 6 between the level of the axle and the steering bar 11 is a truss-shaped bar comprising rearwardly and inwardly sloping end portions 15 and an intermediate portion 16 extending parallel to the axle 6 and steering bar 11. The bar portion 16 is slightly in advance of the steering bar 11. Means are provided to securely and detachably connect the steering rod 11 to the bar portion 16. Such means may be variously constructed and the invention in its broader aspects is not limited to the exact means for making the connection. However, these means may be constructed as will now be described.

The bar portion 16 is provided with a perforation 17 to receive a pin 18 which also passes through a perforation 19 in an arm 20. It is desirable for a strong connection to provide a bar 21 corresponding to the bar portion 16 and slightly spaced therefrom and fastened at its ends by suitable means as rivets 22 to the bar portions 15 so as to form a slot 22' to receive the forward end of the arm 20. The bar 21 is provided with a perforation 23 in alinement with the perforation 17 and the pin 18 is sufficiently long to engage the perforation 23.

The rear end of the arm 20 is provided with U-bolts 24 which slidably engage the steering bar 11, there being a set screw 25 screw-threaded into a hole 26 in the arm 20 and having its outer end engaging the steering bar 11 so as to adjustably connect the steering bar 11 with the arm 20. Thus the arm 20 can be accurately positioned after the parts are assembled so as to bring the perforation 19 in exact alinement with the perforations 17, 23 so that the pin 19 can readily be inserted through all of the perforations.

When the wheels 2 are running on an ordinary roadway the pin 18 will be removed from the arm 20 so as to allow the wheels to be steered by manipulation of the rod 14 in a manner well understood in the automobile art. When the wheels have been driven onto the rails 3 the pin 18 will be inserted so as to engage the arm 20 and thus lock the steering bar 11 against movement as is readily understood.

Suitable mechanism may be provided to move the pin 18 into and out of engagement with the arm 20 so that the operation can be performed from the driver's seat, but such mechanism is not shown and described herein as it forms no part of this present invention.

I claim:

1. The combination with the axle of an auto vehicle, of wheels having rail and road treads and dirigibly connected with the axle, means including a steering rod to steer the wheels, a bar having inwardly and forwardly slanting end portions fastened to the axle, said bar having an intermediate portion extending parallel with the steering rod, an arm rigidly fixed to the steering rod and extending rearward from the steering rod to adjacent the parallel portion of the bar, and means to detachably connect the arm to the parallel portion of the bar.

2. The combination with the axle of an auto vehicle and springs fastened to said axle, of wheels having rail and road treads and dirigibly connected with the axle, means including a steering rod to steer the wheels, a bar fastened to the axle by the spring-fastening means and having a portion extending parallel with the steering rod, and means detachably connecting the steering rod to the parallel portion of the bar.

Signed at Los Angeles, California, this 26th day of June, 1917.

WILLIAM F. HOLT.

Witnesses:
GEORGE H. HILES,
A. F. SCHMIDTBAUER.